(12) United States Patent
Lutz (10) Patent No.: US 12,124,244 B2
(45) Date of Patent: Oct. 22, 2024

(54) CONFIGURABLE NOTIFICATIONS ABOUT STATE CHANGES OF TECHNICAL OBJECTS

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 153 days.

(21) Appl. No.: 17/677,057

(22) Filed: Feb. 22, 2022

(65) Prior Publication Data
US 2022/0269243 A1    Aug. 25, 2022

(30) Foreign Application Priority Data
Feb. 23, 2021 (EP) ..................................... 21158798

(51) Int. Cl.
*G05B 19/418* (2006.01)
(52) U.S. Cl.
CPC .. *G05B 19/418* (2013.01); *G05B 2219/37591* (2013.01)
(58) Field of Classification Search
CPC ........ G05B 19/418; G05B 2219/31457; G05B 2219/31472; G05B 2219/31478;
(Continued)

(56) References Cited

U.S. PATENT DOCUMENTS

| 6,501,996 B1 * | 12/2002 | Bieber ............... G05B 19/4185 700/20 |
| 2005/0256669 A1 * | 11/2005 | Mitsui ................... H01J 37/222 702/123 |

(Continued)

FOREIGN PATENT DOCUMENTS

EP        3623891        3/2020

OTHER PUBLICATIONS

Iconics: "Iconics—AlarmWorX64"; Internet; 1, pp. 1-8, Jan. 1, 2015.

(Continued)

*Primary Examiner* — Kidest Bahta
(74) *Attorney, Agent, or Firm* — Cozen O'Connor (57) ABSTRACT

A control system for a technical plant, in particular a process or manufacturing plant, includes an operator station server and an operator station client, wherein the operator station server includes a computer implemented visualization service that transmits a plant mimic diagram to the operator station client that visually presents the plant mimic diagram to an operator of the control system, where a digital process image of the technical plant is implemented on the operator station server, the operator station server additionally enables the operator to continuously monitor a runtime operator specifiable state of an operator-specifiable measuring device of the technical plant, where the operator station server additionally notifies the operator of a state change of the measuring device, independently of a visual presentation of the plant mimic diagram, and where the measuring device state is obtainable from the digital process image of the technical plant implemented on the operator station server.

20 Claims, 5 Drawing Sheets

(58) Field of Classification Search
CPC ...... G05B 2219/37591; G05B 23/0216; G05B 1/00; G05B 24/00; G05B 23/00; G05B 2219/00
See application file for complete search history.

(56) References Cited

U.S. PATENT DOCUMENTS

| | | | |
|---|---|---|---|
| 2009/0149987 A1* | 6/2009 | Hyde | G07F 11/70 700/231 |
| 2014/0188269 A1* | 7/2014 | Orschel | G05B 19/0426 700/159 |
| 2016/0266565 A1* | 9/2016 | McKelvey et al. | G05B 19/054 |
| 2019/0102076 A1* | 4/2019 | Naidoo | G05B 19/409 |
| 2019/0289100 A1* | 9/2019 | Ketterle | G05B 19/0426 |
| 2019/0346834 A1* | 11/2019 | Saunders, Jr. | G05B 19/418 |
| 2022/0129510 A1* | 4/2022 | Fleming | H04L 67/12 |

OTHER PUBLICATIONS

Iconics: "Alarm Tags"; Internet; 9, p. 1, Dec. 12, 2019.
Iconics: "Alarm Server Runtime"; Internet; 10, pp. 1-3, Dec. 10, 2019.
EP Search Report dated Jul. 20, 2021 based on EP 21158798 filed Feb. 23, 2021.

* cited by examiner

CONFIGURABLE NOTIFICATIONS ABOUT STATE CHANGES OF TECHNICAL OBJECTS

BACKGROUND OF THE INVENTION

1. Field of the Invention

The invention relates to use of a control system for operating a technical plant, in particular a process or manufacturing plant, a method for setting up continuous monitoring of the state of a measuring device, a control system for the technical plant, where the control system comprises at least one operator station server and one operator station client, where the operator station server comprises a computer-implemented visualization service that is configured to transmit at least one plant mimic diagram to the operator station client, and where the operator station client is configured to visually present the at least one plant mimic diagram to an operator of the control system for operation and monitoring of the technical plant, and where a digital image of the technical plant, in particular a process image, is implemented on the operator station server.

2. Description of the Related Art

A control system of a technical plant can comprise a large number of components that have to be designed, loaded and updated during the life cycle of the plant. For example, when design changes are made, the components of a control system (e.g., automations, and/or operator station servers) are loaded from an engineering station server into an operator station server. Such a control system is disclosed, for example, in EP 3 623 891 A1.

In the present context, a control system is understood to mean a computer-aided technical system that comprises functionalities for displaying, operating and controlling a technical system such as a manufacturing or production plant. In addition to an operator station server and an operator station client, the control system can also comprise, for example, so-called process- or manufacturing-oriented components that are used to control actuators or sensors.

The technical plant can be a plant from the process industry, such as a chemical, pharmaceutical or petrochemical plant, or a plant from the food and beverage industry. The term also includes any plants from the production industry, or factories in which, for example, cars or goods of any kind are produced. Technical plants suitable for implementing the method in accordance with the invention can also come from the field of energy production. Wind turbines, solar parks or power plants for energy production are also covered by the term technical plant.

In the present context, the term "operator station server" refers to a server that centrally acquires data from an operator control and monitoring system and, as a rule, alarm and measured value archives from a control system of a technical plant and makes this data available to users. The operator station server usually establishes a communication link to automation systems (such as an automation device) of the technical plant and forwards technical plant data to so-called "operator station clients" which are used to control and monitor an operation of the individual functional elements of the technical plant.

The operator station server itself can have client functions in order to access the data (archives, messages, tags, variables) of other operator station servers. Thus, images of technical plant operation on the operator station server can be combined with variables of other operator station servers (server-server communication). The operator station server can be, but is not limited to, a SIMATIC PCS 7 or SIMATIC PCS neo Industrial Workstation Server from SIEMENS.

For operator control and monitoring of technical plants, operators are offered dynamically provided plant mimic diagrams, i.e., graphical views for displaying trends, alarm sequences or states of measuring devices (for example, process measuring devices), and the like. During normal operation, overviews in which the current state of the plant components is displayed in "compressed" form are of particular relevance. An operator typically acts when alarms occur during operation, or to perform routine checks or optimizations. For example, an operator routinely spot-checks the signal quality of individual measuring devices, the presence of active memo messages from other operators, and/or operational settings of measuring devices.

In order not to have to select all the plant mimic diagrams for checking particular states of particular measuring devices (for example, process objects of the "controller" type in a "plant section 1" in the "simulation" state), operators can search for and call up state information of measuring devices from digital images of the technical plant, in particular process images, during runtime using a special search function of an operator station client.

The search and retrieval of states of measuring equipment must be performed by operators on an ad hoc basis—as a random sample, so to speak. If the operator is now obliged to observe certain states over a longer period of time (for example, in the course of maintenance, commissioning, and/or updating), according to the state of the art they have no option but to leave the special search function in the operator station client open, which severely restricts actual operator control and monitoring via plant mimic diagrams. In addition, according to the prior art, only one query can be processed, which, moreover, is not continuously updated, but is rather a snapshot that must be continuously retrieved during longer observation.

SUMMARY OF THE INVENTION

It is an object of the invention to provide a control system for a technical plant which facilitates operator control and monitoring of the technical plant while avoiding restrictions in operator control and monitoring.

This and other objects and advantages are achieved in accordance with the invention by a control system for a technical plant, in particular a manufacturing or process plant, use of the control system and by a method for operating a technical plant, in particular a process or manufacturing plant, utilizing the control system, where an operator station server is configured to enable an operator, via an operator station client, to continuously monitor, during runtime, the determinable state of a determinable measuring device of the technical plant, which state can be determined by the operator during runtime of the technical plant, where the operator station server is configured to notify the operator, via the operator station client, of a change in the state of the measuring device, independently of a visual presentation of the plant mimic diagram, and where the state of the measuring device can be obtained from the image of the technical plant implemented on the operator station server.

The plant mimic diagram can include, for example, an alarm indication and "faceplates", i.e., graphical representations of measuring devices of the technical plant.

The term "measuring device" is understood here, in accordance with DIN standard 1319, as meaning the totality of measuring devices and possibly additionally necessary equipment for achieving a particular measurement result. In the simplest case, the measuring device is therefore a single measuring device that provides a measurement result.

A snapshot of the (signal) states of measuring devices that can be connected to the operator station server via a device interface is stored in the digital image of the operator station server.

The operator station server is configured to enable the operator to continuously monitor the state of a measuring device of the technical plant. While doing so, the operator can specify which state of which measuring device they want to have monitored. In other words, on the one hand, the operator can specify which measuring device they want to monitor. On the other hand, they can also define which state of a particular measuring device they want to have monitored (in the event that a plurality of states can be assigned to a measuring device).

The operator station server can take the state or a state of the measuring device from a digital image of the technical plant that is implemented on the operator station server. The operator station server is then configured to notify the operator of a change of state via the operator station client. This is irrespective of which plant mimic diagram is currently displayed to the operator by the operator station client. The measuring device to which the monitoring relates does not therefore have to be currently visualized, for example by a faceplate.

An operator-specifiable state can be, for example, the statement "Threshold value XY is exceeded or undershot", as indicated by a current measurement signal output by the measuring device. If the measurement signal exceeds the threshold value XY, then the state specified by the operator changes from "Threshold value is not exceeded or undershot" to "Threshold value is exceeded or undershot". The operator then receives a corresponding, for example, graphically displayed notification from the operator station client. Audible or haptic notifications are also possible.

Other examples of states are "Manual control/automatic mode", "Active/simulation" or "Signal quality adequate". Reference can also be made to an operational state of the measuring device. The common feature of the states is that they have low degree of volatility and can change in the space of minutes, hours or days. Not included in the term "state" is the measured value of the measuring device currently output by the measuring device, such as a sensor or transmitter, since it has a high degree of volatility in the order of seconds or milliseconds that would result in an excessively large number of notifications for the operator.

By using the control system in accordance with the invention, operators of a technical plant can set up configurable notifications for state changes of measuring devices of the technical plant during runtime of the technical plant. This allows operators to set up situation-defined automatic monitoring of object states, so that automatic notification can take place if these states change. This does not restrict operation and observation, nor can operators miss state transitions that are important to them.

The operator station server is preferably configured to enable the operator, through the operator station client, to continuously monitor a plurality of operator-specifiable states of a plurality of measuring devices of the technical plant, where the operator station server is configured to notify the operator, through the operator station client, each time a change occurs in the state of a measuring device, independently of a visual display of the plant mimic diagram. The states of the plurality of measuring devices can be specified independently of one another.

The operator can therefore also set up monitoring of a plurality of states, which can differ from one another, of a single measuring device. However, they can also set up monitoring of a plurality of states of a plurality of measuring devices. It is also possible for the same type of state to be monitored for a plurality of measuring devices.

With particular preference, the operator station server is configured to store, in a user-specific memory, the state or states that the operator has specified for continuous monitoring. The state monitoring(s) configured by the operator during runtime can thus be permanently saved, so that it/they is/are available and can also be reactivated by the operator after a logon (also on other operator station clients).

Advantageously, the operator can decide whether a monitoring they have already set up should be active or inactive. The operator station server is preferably configured to transmit status information to the operator station client for visual display by the operator station client such that the status information indicates whether monitoring of a state of the measuring device is active (or inactive) for a particular measuring device of the technical plant.

It is also an object of the invention to provide a method for setting up continuous monitoring of a state of a measuring device of a technical plant, in particular a manufacturing or process plant, by a control system of the technical plant, where the control system includes at least one operator station server and one operator station client. The method comprises a) transmitting a request from an operator of the technical plant to the operator station server to set up continuous monitoring by the operator station client, where the operator specifies the measuring device of the technical plant and the state of the measuring device for which the monitoring is to be set up, b) setting-up, by the operator station server, the continuous monitoring of the state of the measuring device of the technical plant as specified by the operator during runtime of the technical plant, where the operator station server takes the state of the measuring device from a digital image of the technical plant implemented on the operator station server.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described features, characteristics and advantages of the present invention, as well as the manner in which they are achieved, will become clearer and more readily understood in conjunction with the following description of an exemplary embodiment which will be explained in more detail with reference to the accompanying drawings, in which.

DETAILED DESCRIPTION OF THE EXEMPLARY EMBODIMENTS

Figure 1:
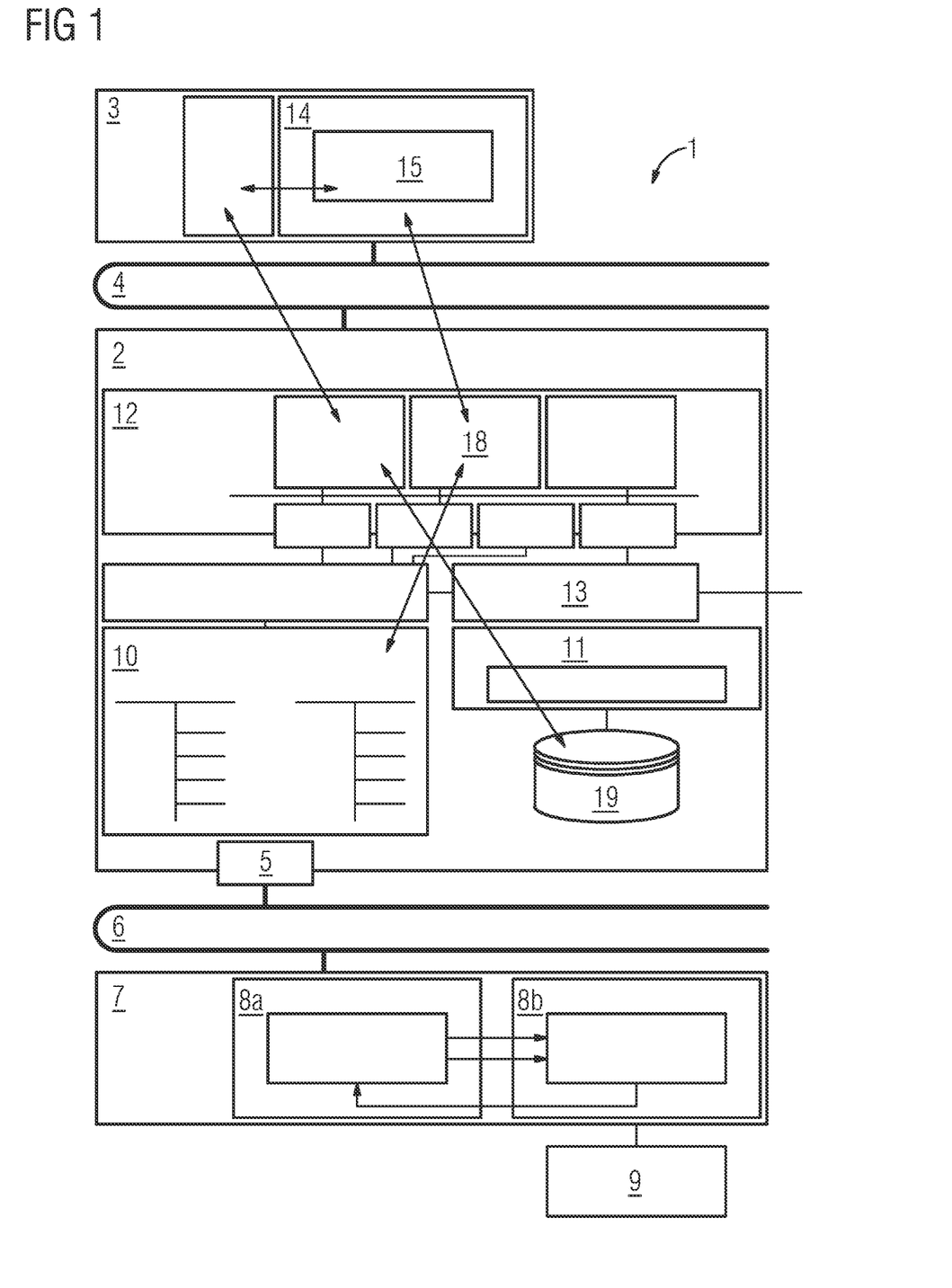
FIG. 1 shows a schematic illustration of a control system in accordance with the invention.

FIG. 1 shows part of an inventive control system 1 of a technical plant designed as a process plant, i.e., an industrial automation plant. The control system 1 comprises an operator station server 2 and an operator station client 3.

The operator station server 2 and the operator station client 3 are interconnected via a terminal bus 4 and are optionally connected to other components (not shown) of the control system 1, such as a process data archive.

For operator control and monitoring purposes, a user or operator can access the operator station server 2 or other operator station servers (not shown) via the operator station client 3 over the terminal bus 4. The terminal bus 4 can be formed as an Industrial Ethernet, for example, but is not limited thereto.

The operator station server 2 has a device interface 5 that is connected to a plant bus 6. With this device interface 5, the operator station server 2 can communicate with an automation device 7 and also with other optionally present components of the process plant. The plant bus 6 can be formed as an Industrial Ethernet, for example, but is not limited thereto. The automation device 7 can be connected to any number of subsystems (not shown). An automation 8a, 8b is implemented on the automation device 7 that is used to operate a measuring device 9. The automation device 7 reads process measurement values from the measuring device and transmits them to the operator station server 2 where they are stored in a process image 10, i.e., a digital image.

Among other things, a user selection service 11 and a visualization service 12 are implemented on the operator station server 2. A distribution service 13, also implemented on the operator station server 2, coordinates data synchronization with other operator station servers (not shown), but this will not be discussed in detail here.

The visualization service 12 is configured to transmit at least one plant mimic diagram 14 to the operator station client 3, which visually displays the plant mimic diagram 14 to an operator of the process plant. The plant mimic diagram 14 (usually a plurality of plant mimic diagrams) may have been previously created by a project engineer in an engineering phase of the process plant and transmitted to the operator station server 2. The plant mimic diagram 14 includes, among other elements, a graphical representation of the measuring device 9.

Figure 2:
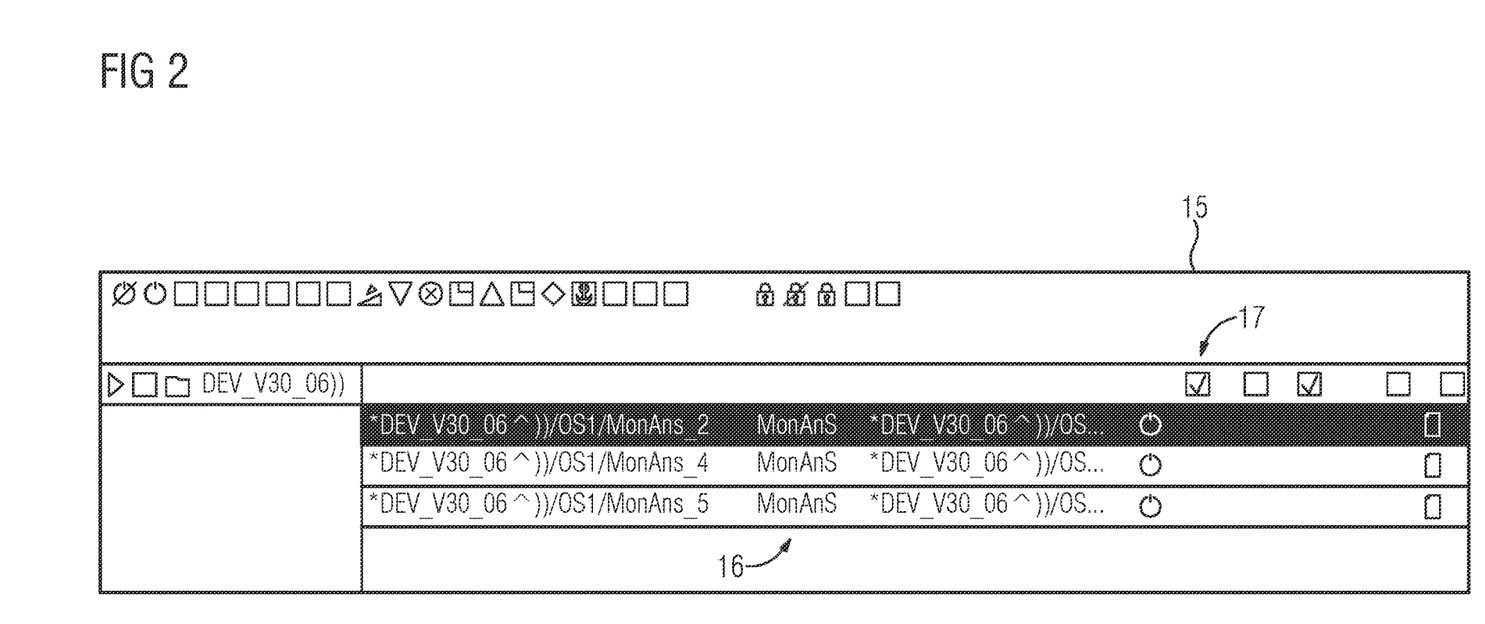
FIG. 2 shows an overview display of a plant mimic diagram.

In accordance with the method of the invention, an operator selects a measuring device 9 whose state they want to have monitored. For this purpose, they can use a special overview display 15 that can be displayed by the operator station client 3. In the overview display 15, the operator can, for example, view a list 16 of measuring devices 9 that can have a particular state. The operator can filter the list, for example, by states. Such an overview display 15 is shown in FIG. 2.

The operator now specifies which state of which measuring device 9 they want to have monitored. In the overview display 15, this is symbolized by the selection of a selection box 17 (a check mark means that this state is selected for monitoring).

A monitoring service 18 implemented on the operator station server 2 then logs on to the process image 10 for monitoring of the specified measuring device 9. This means that it is notified by the process image 10 when the operator-specified state of the measuring device 9 changes.

Parallel thereto, the monitoring service 18 transmits the selection made by the operator (i.e., which state of which measuring device) to the user selection service 11, which stores the choice in a user-specific memory 19 on the operator station server 2. The memory 19 does not necessarily have to be located on the operator station server 2, but can in particular also be located outside the process plant. Storage of the selection made by the operator in the memory 19 enables the operator to access the desired monitoring even after logging off and logging on again in the control system 1, without having to specify it again.

If a change of state of a measuring device 9 is indicated by the process image 10, the monitoring service 18 checks whether a condition of the state monitoring requested by the operator is thereby fulfilled, and reports this (if applicable) via a notification to the operator station client 3 that displays the notification in the currently opened plant mimic diagram 14, irrespective of whether the measuring device 9 in question is currently represented digitally (i.e., graphically) in this plant mimic diagram 14.

Figure 3:
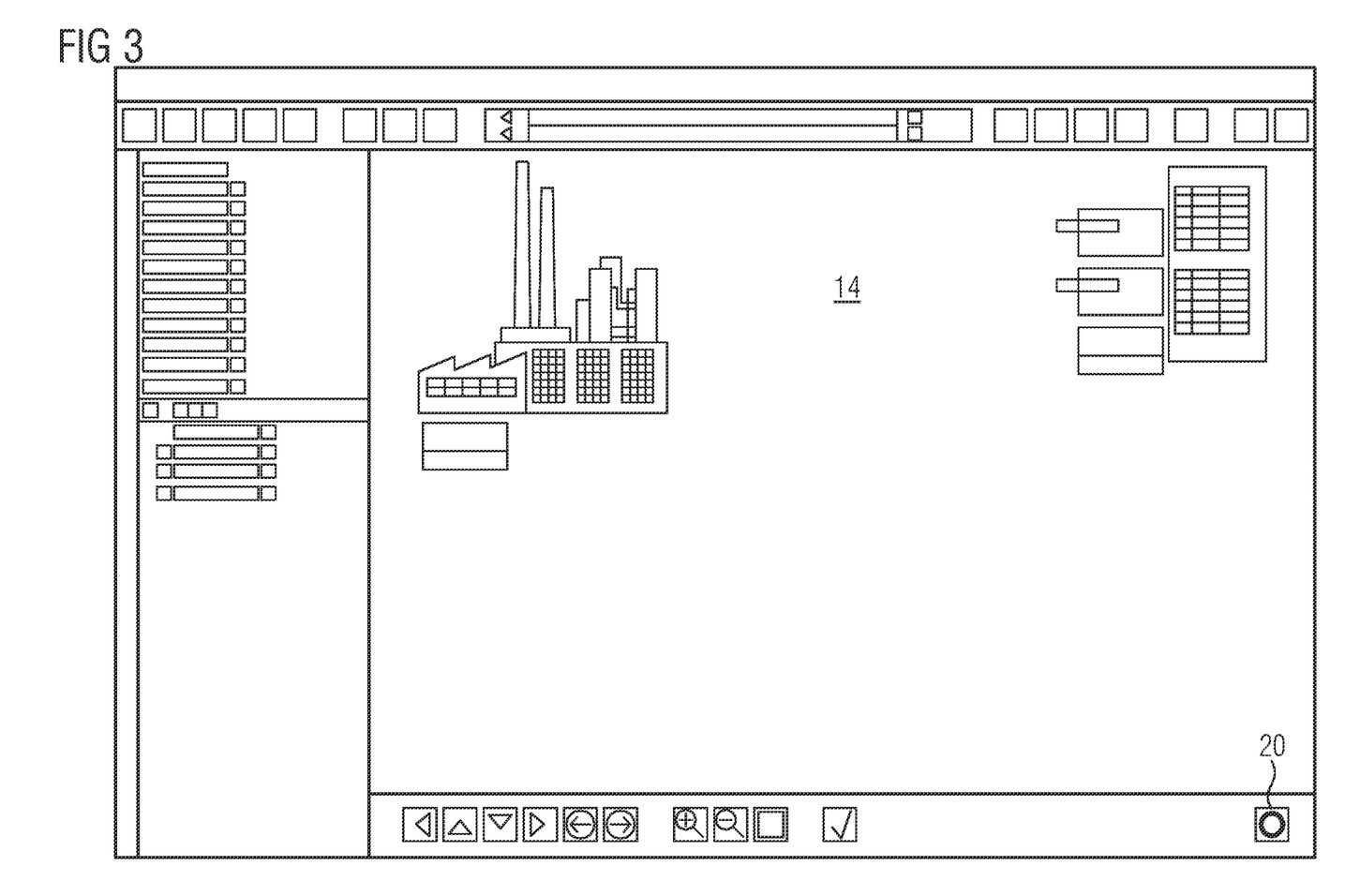
FIG. 3 shows a plant mimic diagram for operator control and monitoring in accordance with a first embodiment.

FIG. 3 shows the integration, in a plant mimic diagram 14 displayed by the operator station client 3, of the notifications that can be configured on an operator-specific basis and during runtime of the process plant in the event of status changes of measuring devices 9. Active state monitoring is illustrated by a circle symbol 20 as status information in the lower right-hand region of FIG. 3. Using the same circle symbol 20, it is also possible for the operator to deactivate preconfigured state monitoring.

Figure 4:
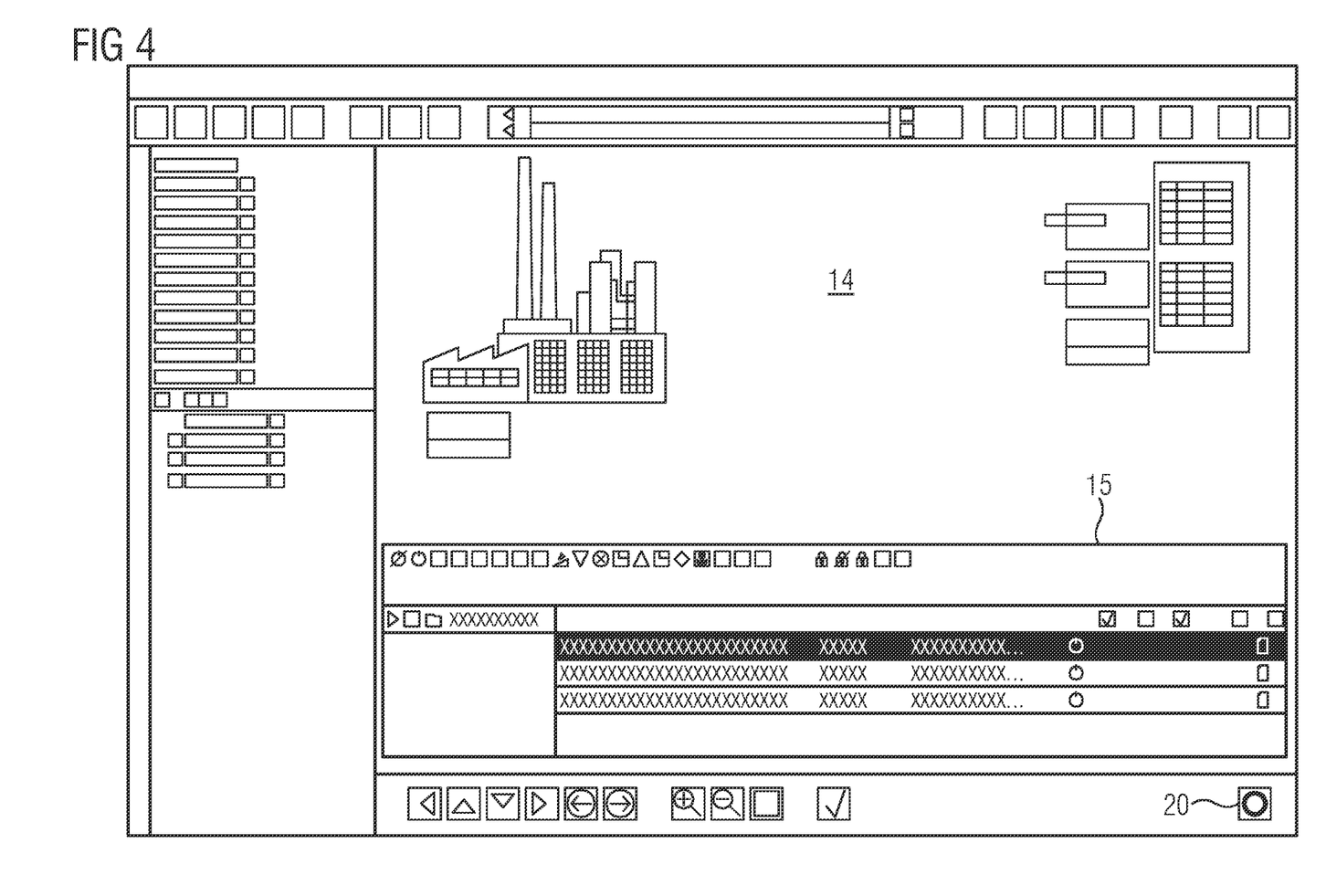
FIG. 4 shows the plant mimic diagram of FIG. 3 in accordance with an alternative embodiment.

FIG. 4 shows the same plant mimic diagram 14 as in FIG. 3. Additionally illustrated here is the overview display 15 that the operator can use not only to set up a new monitoring, but also to reactivate already existing state monitorings.

With the thus described method and/or the control system 1, it is virtually impossible for a change of state that is currently important for the operator (even without alarm management explicitly defined for this purpose in the engineering) to remain hidden from the operator. If an operator has configured a plurality of state monitorings, then they can freely decide which of them should be active.

Figure 5:
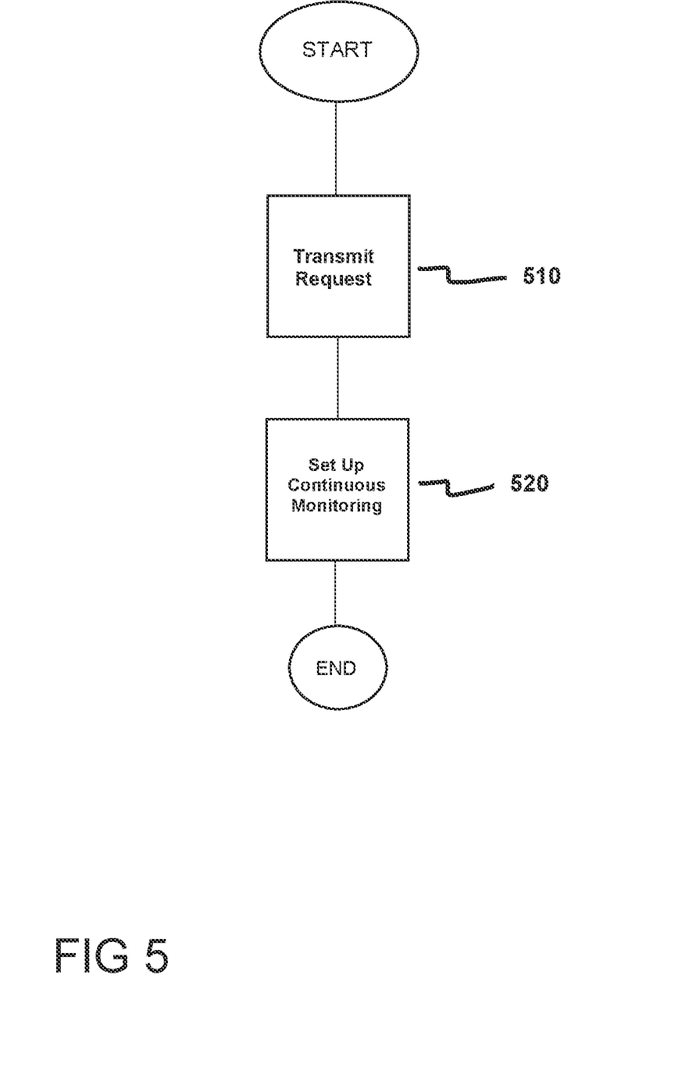
FIG. 5 is a flowchart of the method in accordance with the invention.

FIG. 5 is a flowchart of the method for setting up continuous monitoring of the state of a measuring device of a technical plant by a control system 1 of the technical plant, where the control system 1 includes at least one operator station server 2 and an operator station client 3.

The method comprises a) transmitting a request from an operator of the technical plant to set up continuous monitoring by the at least one operator station client 3 to the operator station server 2, as indicated in step 510. In accordance with the invention, the operator specifies a measuring device 9 of the technical plant and the state of the measuring device 9 for which the monitoring is to be set up.

Next, b) continuous monitoring by the operator station server 2 of the state of the measuring device 9 of the technical plant as specified by the operator during runtime of the technical plant is set up, as indicated in step 520. In accordance with the invention, the operator station server 2 obtains the state of the measuring device 9 from a digital image 10 of the technical plant implemented on the operator station server 2.

Overall, the invention allows an operator to individually set up state monitoring for measuring devices in order to be automatically notified of state changes during runtime. Full operator control and observation is possible despite the state monitoring. The state monitoring(s) can be flexibly and efficiently set up by the operator and also permanently stored by user selections in order to also enable routine checks and inspection schedules to be supported. In general, the invention can improve the operator control and monitoring of the process plant.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for a technical plant, the control system comprising:
    at least one operator station server directly connected to a terminal bus and directly connected to a plant bus; and
    an operator station client directly connected to the terminal bus;
    wherein the at least one operator station server comprises a computer-implemented visualization service which is configured to transmit at least one plant mimic diagram to the operator station client;
    wherein the at least one operator station client is further configured to visually present the at least one plant mimic diagram to an operator of the control system for operating and observing the technical plant;
    wherein a digital image of the technical plant comprising a process image having process measurement values from an operator-specifiable measuring device of the technical plant is implemented on the operator station server;
    wherein the operator station server is configured to enable the operator, via the at least one operator station client, to continuously monitor, during runtime, a state, specifiable by the operator during runtime of the technical plant, of an operator-specifiable measuring device of the technical plant;
    wherein the operator station server is further configured to notify the operator, via the at least one operator station client, of a change in the state of the measuring device, independently of a visual presentation of the plant mimic diagram; and
    wherein a state of the measuring device is obtainable from the digital image of the technical plant implemented on the operator station server.

2. The control system as claimed in claim 1, wherein the operator station server is further configured to enable the operator, via the at least one operator station client, to continuously monitor a plurality of operator-specifiable states of a plurality of measuring devices of the technical plant; and
    wherein the operator station server is further configured to notify the operator, via the at least one operator station client, of any change in the state of a measuring device, independently of a visual presentation of the plant mimic diagram.

3. The control system as claimed in claim 2, wherein the states of the plurality of measuring devices are each independently specifiable by the operator.

4. The control system as claimed in claim 1, wherein the operator station server is further configured to store, in a user-specific memory, the state or states specified by the operator for continuous monitoring.

5. The control system as claimed in claim 2, wherein the operator station server is further configured to store the state or states specified by the operator for continuous monitoring in a user-specific memory.

6. The control system as claimed in claim 3, wherein the operator station server is further configured to store the state or states specified by the operator for continuous monitoring in a user-specific memory.

7. The control system as claimed in claim 1, wherein whether the continuous monitoring of a state of a measuring device is to be active or inactive is specifiable by the operator.

8. The control system as claimed in claim 1, wherein the operator station server is configured to transmit status information for visual display to the operator station client such that the transmitted status information indicates whether monitoring of a state of the measuring device is active for a particular measuring device of the technical plant.

9. The control system as claimed in claim 1, wherein the control system is utilized to operate the technical plant.

10. The control system as claimed in claim 1, wherein the technical plant comprises a process or manufacturing plant.

11. A method for setting up continuous monitoring of a state of a measuring device of a technical plant by a control system of the technical plant, the control system including at least one operator station server directly connected to a terminal bus and directly connected to a plant bus, and including an operator station client directly connected to the terminal bus, the method comprising:
    a) transmitting a request from an operator of the technical plant to set up continuous monitoring by the at least one operator station client directly connected to the terminal bus and directly connected to the plant bus to the operator station server directly connected to the terminal bus, the operator specifying a measuring device of the technical plant and a state of the measuring device for which the monitoring is to be set up; and
    b) setting-up continuous monitoring by the operator station server of the state of the measuring device of the technical plant as specified by the operator during runtime of the technical plant, the operator station server obtaining the state of the measuring device from a digital image of the technical plant implemented on the operator station server;
    wherein the digital image of the technical plant comprises a process image having process measurement values from an operator-specifiable measuring device of the technical plant.

12. The method as claimed in claim 11, wherein the operator transmits to the operator station server a request to set up continuous monitoring, by the at least one operator station client, of a plurality of states of a plurality of measuring devices; and
    wherein the operator station server sets up the continuous monitoring of the plurality of states of the plurality of measuring devices of the technical plant as specified by the operator during runtime of the technical plant.

13. The method as claimed in claim 11, wherein the states of the plurality of measuring devices are each specified independently of one another by the operator.

14. The method as claimed in claim 12, wherein the states of the plurality of measuring devices are each specified independently of one another by the operator.

15. The method as claimed in claim 11, wherein the operator station server stores the state or states that the operator has specified for continuous monitoring in a user-specific memory.

16. The method as claimed in claim 12, wherein the operator station server stores the state or states that the operator has specified for continuous monitoring in a user-specific memory.

17. The method as claimed in claim 13, wherein the operator station server stores the state or states that the operator has specified for continuous monitoring in a user-specific memory.

18. The method as claimed in claim 11, wherein the operator specifies whether the continuous monitoring of a state of a measuring device is to be active or inactive.

19. The method as claimed in claim 11, wherein the operator station server is configured to transmit status information for visual display to the operator station client such that the status information indicates whether monitoring of a state of the measuring device is active for a particular measuring device of the technical plant.

20. The method as claimed in claim 11, wherein the technical plant comprises a process or manufacturing plant.

* * * * *